(12) United States Patent
Vook et al.

(10) Patent No.: US 7,330,211 B2
(45) Date of Patent: Feb. 12, 2008

(54) CAMERA MODULE WITH FOCUS ADJUSTMENT STRUCTURE AND SYSTEMS AND METHODS OF MAKING THE SAME

(75) Inventors: Dietrich W. Vook, Los Altos, CA (US); Richard L. Baer, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 848 days.

(21) Appl. No.: 10/615,622

(22) Filed: Jul. 8, 2003

(65) Prior Publication Data

US 2005/0007485 A1    Jan. 13, 2005

(51) Int. Cl.
*H04N 5/225* (2006.01)

(52) U.S. Cl. .................................. 348/340; 348/373

(58) Field of Classification Search ............. 348/340, 348/335, 345, 373; 398/72, 79
See application file for complete search history.

(56) References Cited

U.S. PATENT DOCUMENTS

| | | | |
|---|---|---|---|
| 4,575,373 A | 3/1986 | Johnson | |
| 5,612,826 A | 3/1997 | Ohshita | |
| 5,615,052 A | 3/1997 | Doggett | |
| 5,851,255 A | 12/1998 | Ohtsuki et al. | |
| 5,895,129 A * | 4/1999 | Ohta | 396/79 |
| 6,067,421 A * | 5/2000 | Kitazawa et al. | 396/133 |
| 6,188,841 B1 | 2/2001 | Kamata | |
| 6,212,021 B1 * | 4/2001 | Hase | 359/820 |
| 6,291,818 B1 | 9/2001 | Allport et al. | |
| 6,483,101 B1 | 11/2002 | Webster | |
| 2002/0101531 A1 * | 8/2002 | Kaneda | 348/347 |
| 2003/0056544 A1 | 3/2003 | Yamanaka | |

* cited by examiner

*Primary Examiner*—Lin Ye
*Assistant Examiner*—Gevell Selby
(74) *Attorney, Agent, or Firm*—RatnerPrestia

(57) ABSTRACT

Camera modules with focus adjustment structures and systems and methods of making the same are described. In one aspect, a sensor housing having an image sensor, a lens holder comprising a lens, and a deformable focus adjustment structure are provided. The focus adjustment structure is deformed to move the lens whereby light is focused onto the image sensor.

29 Claims, 3 Drawing Sheets

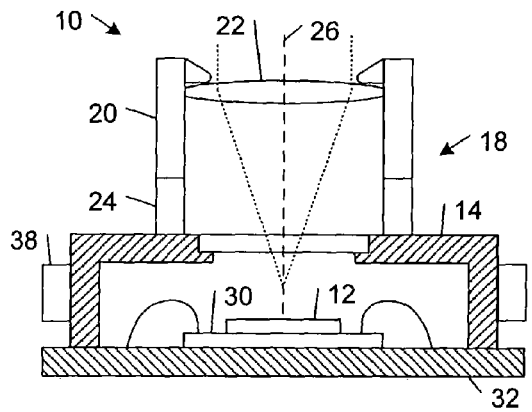
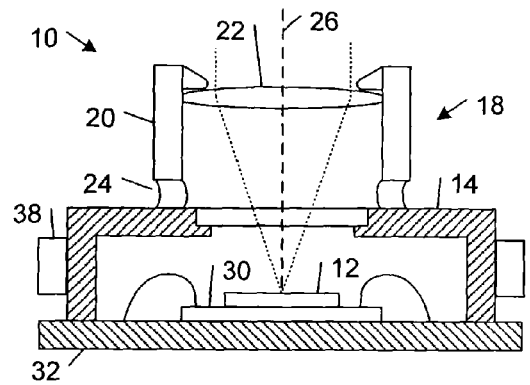
FIG. 3A        FIG. 3B
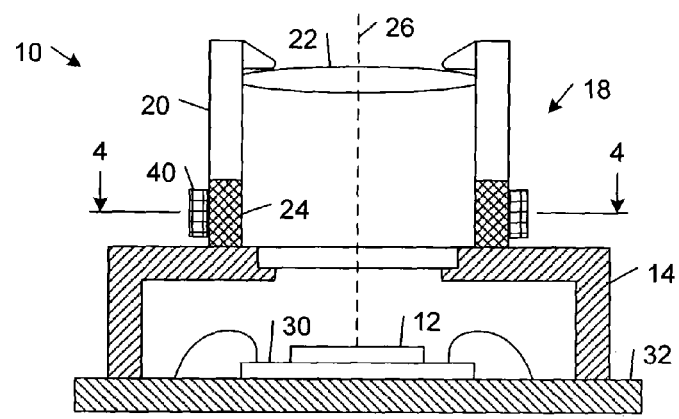
FIG. 4
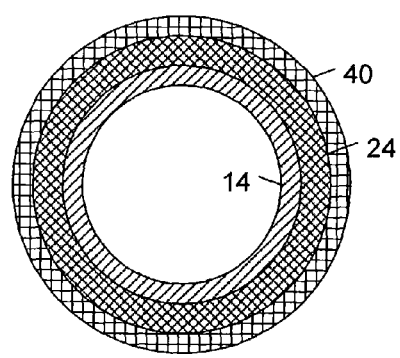
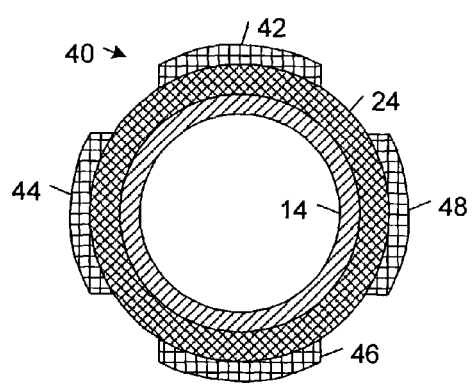
FIG. 5A        FIG. 5B

CAMERA MODULE WITH FOCUS ADJUSTMENT STRUCTURE AND SYSTEMS AND METHODS OF MAKING THE SAME

BACKGROUND

Camera modules are being incorporated into a wide variety of systems and devices, including handheld electronic devices, such as cellular telephones and personal digital assistants. A camera module typically includes an image sensor and a lens assembly. During manufacture of a camera module, the lens assembly should be aligned precisely with respect to the image sensor. In one alignment approach, the lens assembly is attached to the housing and, subsequently, the position of the lens assembly is adjusted manually by turning adjustment screws until the lens assembly is focused properly onto the image sensor. In another alignment approach, a lens holder containing a lens assembly has threads that mate with a threaded lens holder support that is formed in a molded package that contains an image sensor. The position of the lens assembly is adjusted toward and away from the image sensor by screwing the lens holder into and out of the lens holder support. Before or after the lens support is focused onto the image sensor, an adhesive is applied to secure the lens holder to the molded image sensor package.

SUMMARY

The invention features camera modules with focus adjustment structures and systems and methods of making the same. The invention allows a camera module lens assembly to be readily and controllably adjusted with respect to an image sensor by controlled deformation of a deformable focus adjustment structure.

In one aspect, the invention features a method of making a camera module. In accordance with this inventive method, a sensor housing including an image sensor, a lens holder including a lens, and a deformable focus adjustment structure are provided. The focus adjustment structure is deformed to move the lens whereby light is focused onto the image sensor.

In another aspect, the invention features a system for making a camera module. The system includes a camera module holder that is operable to hold a camera module comprising an image sensor that is disposed within a sensor housing, and a lens holder that is attached to the sensor housing. The lens holder includes a lens and a deformable focus adjustment structure. The system also includes a focus adjuster that is operable to deform the focus adjustment structure to move the lens whereby light is focused onto the image sensor.

In another aspect, the invention features a camera module that includes an image sensor, a lens holder, and a focus adjustment structure. The image sensor is disposed within a sensor housing. The lens holder includes a lens. The focus adjustment structure is disposed between the lens holder and the sensor housing. The focus adjustment structure is deformed whereby light passing through the lens is focused onto the image sensor.

Other features and advantages of the invention will become apparent from the following description, including the drawings and the claims.

DESCRIPTION OF DRAWINGS

FIG. 1 is a diagrammatic side view of a camera module having a lens and an image sensor.

FIG. 2 is a flow diagram of a method of making the camera module of FIG.

FIG. 3A is a diagrammatic side view of the camera module of FIG. 1 before a deformable focus adjustment structure is deformed to move the lens into a position whereby light is focused onto the image sensor.

FIG. 3B is a diagrammatic side view of the camera module of FIG. 1 showing the focus adjustment structure deformed and the lens positioned to focus light onto the image sensor.

FIG. 4 is a diagrammatic side view of the camera module of FIG. 3A with a focus adjuster disposed about the focus adjustment structure.

FIG. 5A is a diagrammatic cross-sectional view of the camera module of FIG. 4 taken along the line 4-4 with the focus adjuster implemented by a heating ring.

FIG. 5B is a diagrammatic cross-sectional view of the camera module of FIG. 4 taken along the line 4-4 with the focus adjuster implemented by a series of four spaced-apart heating elements.

FIG. 6 is a diagrammatic side view of the camera module of FIG. 3A with radiant energy being applied to the focus adjustment structure.

FIG. 7 is a diagrammatic side view of an implementation of the camera module of FIG. 6 in which a lens holding section of the lens holder includes an exterior deformation inhibiting layer.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

FIG. 1 shows an embodiment of a camera module 10 that includes an image sensor 12 that is disposed within a sensor housing 14 that includes a window 16. A lens holder 18 is attached to the sensor housing. Lens holder 18 includes a lens holding section 20 that contains at least one lens 22. Lens holder 18 additionally includes a focus adjustment structure 24 disposed between lens holding section 20 and sensor housing 14.

As explained in detail below, during fabrication, the focus adjustment structure 24 is deformed to move the lens 22 so that light is focused onto the active area of image sensor 12. In particular, the distance separating the lens 22 and the image sensor 12 (i.e., the z-axis separation distance), as well as the location where the optical axis 26 of lens 22 intersects image sensor 12 (i.e., the tilt of lens 22 with respect to the x-y plane), may be readily adjusted so that light is focused by the lens 22 onto image sensor 12. In this way, a camera module 10 may be fabricated initially with relatively relaxed manufacturing tolerances and, subsequently, the lens 22 may be aligned accurately at the end of the manufacturing process. This may allow manufacturing costs to be reduced substantially in some circumstances.

As used herein, the terms “focus” and “focused” do not refer to perfect or maximal focus, but rather refer to the condition of being focused within a tolerance range specified for camera module 10. The specified tolerance range typically varies depending on the target application or target market for the camera module.

Figure 1:
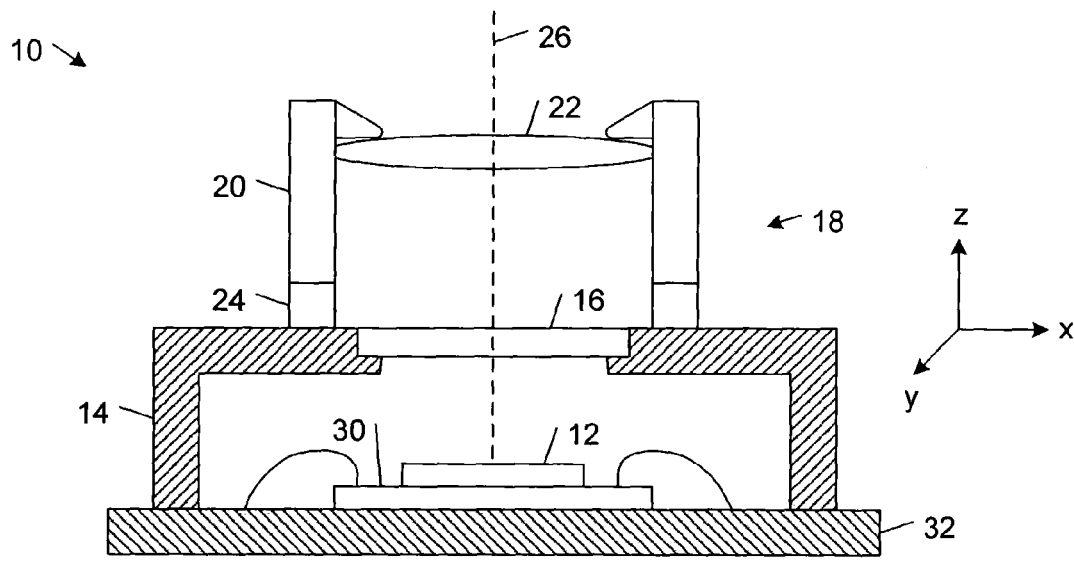
Figure 2:
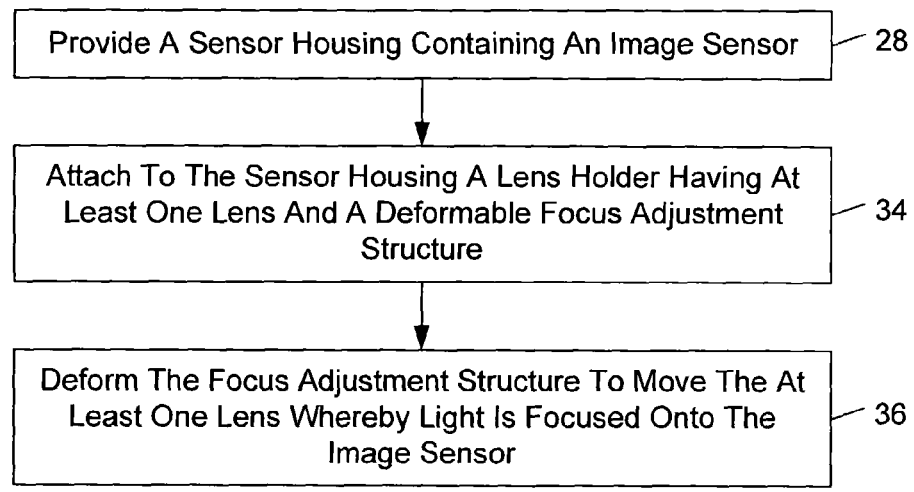

Referring to FIG. 2, in some embodiments, camera module 10 is fabricated as follows. A sensor housing 14 that contains image sensor 12 is provided (block 28). Image sensor 12 may be any suitable image sensing device, including a charge-coupled device (CCD) or a complementary metal-oxide-semiconductor (CMOS) imaging device. In some implementations, image sensor 12 is mounted within a chip package 30 that is wirebonded to a substrate 32 (e.g., a printed circuit board). The sensor housing 14 may be fabricated from any suitable housing material, including a ceramic material or a plastic material. Window 16 may be formed of any suitable material that is substantially transparent to radiation with a wavelength within a target wavelength range (e.g., visible light). In some implementations, sensor housing 14, window 16, and substrate 32 form a hermetically sealed image sensor housing.

Lens holder 18 is attached to the sensor housing 14 (block 34). In some implementations, lens holder 18 is a monolithic structure (i.e., formed or composed of material without joints or seams). In some implementations, the lens holding section 20 and the focus adjustment structure 24 are formed of separate parts that are joined, for example, by a suitable adhesive or weld. The lens holding section 20 and the focus adjustment structure may have the same or different chemical compositions. In some embodiments, lens holder 18 is formed of a molded or extruded plastic material.

In some implementations, lens holder 18 and sensor housing 14 are formed as a single monolithic camera module structure, in which case the lens holder attachment step of block 34 is skipped. A monolithic camera module structure may be formed of injection molded plastic material (e.g., a thermoplastic material). Such a monolithic construction may substantially reduce contamination of image sensor 12 and lens 22 by dust and other contaminants during lens alignment.

The focus adjustment structure 24 is deformed to move the lens 22 so that light is focused onto image sensor 12 (block 36). In general, focus adjustment structure 24 includes at least one region that is deformable in response to application of suitable force or energy and that retains a deformed shape after the source of force or energy is removed. The focus adjustment structure 24 may be formed entirely of the same deformable material or it may include discrete axial or radial regions that are formed of different materials, some of which are deformable in response to application of suitable force or energy. Depending on the material used to implement the deformable region of focus adjustment structure, force alone, energy alone, or a combination of force and energy may be applied to move the lens 22 into alignment with image sensor 12. For example, either force or energy may be applied alone in a way that deforms the focus adjustment structure 24 and guides the lens 22 into proper light-focusing position with respect to image sensor 12. Alternatively, an external source may apply energy that increases the compliance of the focus adjustment structure 24 and a separate motive force may be applied concurrently in a way that deforms the focus adjustment structure and guides the lens 22 into proper light-focusing position with respect to image sensor 12. In some embodiments, a motive or guiding force is applied to the top of lens holder 22 while energy is applied to focus adjustment structure 24. The force typically is directed along optical axis 26 and toward sensor housing 14.

FIGS. 3A and 3B show an embodiment of camera module 10 in which focus adjustment structure 24 is formed of a material that is shrinkable in response to applied energy. The applied energy may be any form of energy (e.g., thermal energy, sonic energy, or electromagnetic energy) that is absorbed by focus adjustment structure 24 and induces a deformation of the structure of the focus adjustment structure that changes one or both of the distance separating lens 22 and image sensor 12 or the location where optical axis 26 crosses image sensor 12.

As shown in FIG. 3A, in some circumstances, focus adjustment structure 24 initially is fabricated with a size in the axial (or z-) direction that is greater than required for lens 22 to focus light onto image sensor 12. In some implementations, the length of focus adjustment structure purposefully is oversized by an amount selected to be greater than anticipated manufacturing tolerance variations. These variations may be covered subsequently by deforming the oversized focus adjustment structure 24 to move lens 22 into position to focus light onto the image sensor 12. During the focus adjustment process, the camera module 10 may be held by a camera module holder 38 (e.g., a clamp or other suitable holding device). FIG. 3B shows the camera module 10 after focus adjustment structure 24 has been deformed sufficiently to bring lens 22 into proper light-focusing position with respect to image sensor 12. Any of a wide variety of different focusing and aligning processes may be used to determine when lens 22 is properly positioned with respect to image sensor 12 during the process of deforming focus adjustment structure 24.

In some implementations, focus adjustment structure 24 includes heat shrink material. Exemplary heat shrink materials include thermoplastic compounds, such as polyolefin, PVC (polyvinyl chloride), Teflon® fluoropolymers, neoprene polychloroprene, and Kynar® polyvinylidene fluoride. In these implementations, focus adjustment structure 24 shrinks upon application of heat at or above the shrink temperature of the heat shrink material. During the shrinking process, the internal structural arrangement of the focus adjustment structure 24 changes (e.g., in the case of certain thermoplastic materials, the cross-linking density increases). As shown in FIG. 3B, in some of these implementations, focus adjustment structure 24 shrinks axially (along the z-axis) and radially (in the x-y plane). The range over which focus adjustment structure should shrink in the axial (z-axis) dimension depends on the tolerances of the manufacturing process. An exemplary axial shrink range for common camera module fabrication processes is on the order of about 1 micrometer to about 1 millimeter.

Referring to FIGS. 4, 5A, and 5B, in some embodiments, heat may be applied to focus adjustment structure 24 by a focus adjuster 40 that is disposed about the focus adjustment structure 24. In the embodiment of FIG. 5A, focus adjuster 40 is implemented by an electrically conducting heating ring that is disposed about focus adjustment structure 24. In this embodiment, the heating ring applies heat uniformly about the heat-shrinkable material of focus adjustment structure 24. In the embodiment of FIG. 5B, focus adjuster 40 is implemented by four spaced-apart electrically conducting heating elements 42, 44, 46, 48 that are spaced uniformly around the circumference of focus adjustment structure 24. In this embodiment, heat is applied by heating elements 42-48 uniformly or asymmetrically. In a uniform heating mode of operation, the heating elements 42-48 apply heat uniformly about focus adjustment structure 24 so that the axial separation distance between lens 22 and image sensor 12 is adjusted uniformly about the optical axis 26. In an asymmetric heating mode of operation, one or more sets of heating elements supply different amounts of heat to the focus adjustment structure 24 so that the axial separation distance between lens 22 and image sensor 12 is adjusted asymmetrically about the optical axis 26. This allows the orientation of optical axis 26 of lens 12 to be adjusted so that it is aligned to focus light onto image sensor 12.

Figure 6:
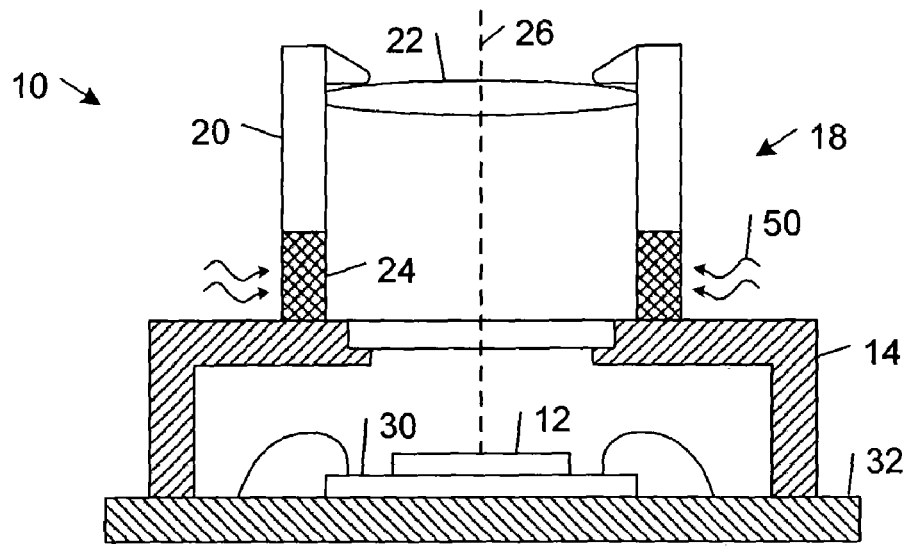

Referring to FIG. 6, in some embodiments, heat may be applied to focus adjustment structure 24 by a source of radiation 50 (e.g., laser radiation). Radiation 50 may be applied uniformly or asymmetrically about the optical axis 26 to achieve results similar to those discussed above in connection with FIGS. 5A and 5B.

Figure 7:
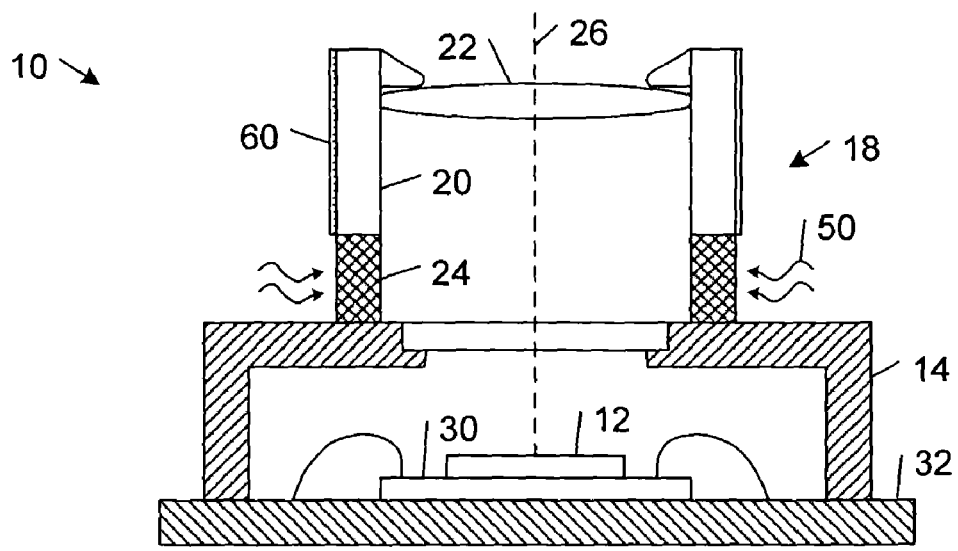

FIG. 7 shows an embodiment of camera module 10 in which the lens is holding section 20 includes an exterior deformation inhibiting layer 60. In this embodiment, lens holding section 20 is formed of the same heat shrinkable material as focus adjustment structure 24. Deformation inhibiting layer 60 is disposed about the entire periphery of lens holding section 20 or it is disposed at one or more discrete locations about lens holding section 20. In some implementations, deformation inhibiting layer 60 is formed of a thermally conductive material (e.g., a metal) that is configured to spread heat sufficiently around the lens holding section 20 that the underlying material of lens holding section 20 is kept below the heat shrink temperature for that material. In other implementations, deformation inhibiting layer 60 is formed of a material that is substantially reflective with respect to the radiation that will be used to deform the focus adjustment structure 24. In these ways, the position and orientation of lens 22 is not changed during the process of deforming the focus adjustment structure 24.

The camera modules described above may be manufactured in batches. After the lenses have been aligned and positioned properly with respect to the image sensors, the completed camera modules in each batch and across batches typically will exhibit variability consistent with the processes used to deform the focus adjustment structures of the camera modules.

Other embodiments are within the scope of the claims.

For example, in some embodiments, the lens holding section 20 may include one or more deformable lens adjustment regions that may be controllably deformed to achieve proper alignment and orientation of lenses within the lens holding section 20.

What is claimed is:

1. A method of making a camera module, comprising;
    providing a sensor housing comprising an image sensor, a lens holder comprising a lens, and a deformable focus adjustment structure; and
    permanently deforming the focus adjustment structure by heating the focus adjustment structure to move the lens to focus light onto the image sensor.

2. The method of claim 1, wherein the focus adjustment structure comprises a material shrinkable in response to energy, and deforming the focus adjustment structure comprises applying energy to at least some of the shrinkable material.

3. The method of claim 2, wherein the focus adjustment structure comprises heat shrink material, and deforming the focus adjustment structure comprises heating at least some of the heat shrink material.

4. The method of claim 3, wherein at Feast some of the heat shrink material is heated by contact with a heating element.

5. The method of claim 3, wherein at east some of the heat shrink material is heated by radiant energy.

6. The method of claim 5, wherein at least some of the heat shrink material is heated by laser energy.

7. The method of claim 2 wherein the shrinkable material is disposed uniformly about an optical axis of the lens.

8. The method of claim 7, wherein energy is applied uniformly to the uniformly disposed shrinkable material to reduce a distance separating the lens and the image sensor.

9. The method of claim 7, wherein energy is applied asymmetrically to the uniformly disposed shrinkable material to adjust where the optical axis intersects the image sensor.

10. The method of claim 2, further comprising guiding the lens holder while applying energy to at least some of the shrinkable material.

11. The method of claim 1, wherein the lens holder is a monolithic structure.

12. The method of claim 1, wherein the lens holder and the sensor housing are formed as a single molding of thermoplastic material.

13. A system for making a camera module, comprising:
    a camera module holder operable to hold a camera module comprising an image sensor disposed within a sensor housing and a lens holder attached to the sensor housing, the lens holder comprising a lens and a deformable focus adjustment structure; and
    a focus adjuster operable to permanently deform the focus adjustment structure by heating the focus adiustment structure such that the focus adjuster moves the lens to focus light onto the image sensor.

14. The system of claim 13, wherein the focus adjustment structure comprises a material shrinkable in response to energy, and the focus adjuster is operable to apply energy to at least some of the shrinkable material.

15. The system of claim 14, wherein the focus adjustment structure comprises heat shrink material, and the focus adjuster is operable to heat at least some of the heat shrink material.

16. The system of claim 15, wherein the focus adjuster comprises a heating element operable for heating at least some of the heat shrink material.

17. The system of claim 15, wherein the focus adjuster comprises a radiant energy source for heating at least some of the heat shrink material.

18. The system of claim 17, wherein the focus adjuster comprises a laser for heating at least some of the heat shrink material with laser energy.

19. The system of claim 14 wherein the shrinkable material is disposed uniformly about an optical axis of the lens and the focus adjuster is operable to uniformly apply energy to the uniformly disposed shrinkable material to reduce a distance separating the lens and the image sensor.

20. The system of claim 14 wherein the shrinkable material is disposed uniformly about an optical axis of the lens and the focus adjuster is operable to asymmetrically apply energy to the uniformly disposed shrinkable material to adjust where the optical axis crosses the image sensor.

21. A camera module, comprising:
    an image sensor disposed within a sensor housing;
    a lens holder comprising a lens; and
    a focus adjustment structure disposed between the lens holder and the sensor housing, wherein the focus adjustment structure is deformed by heating the focus adjustment structure until light passing through the lens is focused onto the image sensor.

22. The camera module of claim 21, wherein the lens holder and the focus adjustment structure are sections of a monolithic structure, the lens holder and the focus adjustment structure comprising regions of material with similar chemical compositions but different internal structural arrangements.

23. The camera module of claim 22, wherein at least one region of the focus adjustment structure corresponds to a deformed version of a region of the lens holder.

24. The camera module of claim 22, wherein the at least one region of the focus adjustment structure corresponds to a heat shrunk version of a heat shrinkable region of the lens holder.

25. The camera module of claim 22, wherein the monolithic structure is formed of a thermoplastic material and the focus adjustment structure and the lens holder are characterized by different respective cross-linking densities.

26. The camera module of claim 21, wherein the lens holder comprises an exterior deformation inhibiting layer and the focus adjustment structure is free of any exterior deformation inhibiting layer.

27. The camera module of claim 26, wherein the exterior deformation inhibiting layer is substantially thermally conductive.

28. The camera module of claim 26, wherein the exterior deformation inhibiting layer is substantially reflective of radiation capable of deforming at least some regions of the lens holder.

29. The camera module of claim 21, wherein the lens holder, the focus adjustment structure, and the sensor housing are formed as a single molding of thermoplastic material.

* * * * *

UNITED STATES PATENT AND TRADEMARK OFFICE
CERTIFICATE OF CORRECTION

PATENT NO. : 7,330,211 B2
APPLICATION NO. : 10/615622
DATED : February 12, 2008
INVENTOR(S) : Vook et al.

It is certified that error appears in the above-identified patent and that said Letters Patent is hereby corrected as shown below:

In column 5, line 45, in Claim 1, after "comprising" delete ";" and insert -- : --, therefor.

In column 5, line 61, in Claim 4, delete "Feast" and insert -- least --, therefor.

In column 5, line 64, in Claim 5, delete "east" and insert -- least --, therefor.

In column 6, line 28, in Claim 13, delete "adiustment" and insert -- adjustment --, therefor.

Signed and Sealed this

Tenth Day of June, 2008

JON W. DUDAS
*Director of the United States Patent and Trademark Office*